(12) United States Patent
Kennedy

(10) Patent No.: US 11,137,006 B2
(45) Date of Patent: Oct. 5, 2021

(54) COLLAPSIBLE TELESCOPING POLE

(71) Applicant: D & M Designs LLC, Hoffman Estates, IL (US)

(72) Inventor: Douglas James Kennedy, Kennewick, WA (US)

(73) Assignee: D & M Designs LLC, Hoffman Estates, IL (US)

(*) Notice: Subject to any disclaimer, the term of this patent is extended or adjusted under 35 U.S.C. 154(b) by 456 days.

(21) Appl. No.: 16/326,166

(22) PCT Filed: Aug. 16, 2017

(86) PCT No.: PCT/US2017/047091
§ 371 (c)(1),
(2) Date: Feb. 15, 2019

(87) PCT Pub. No.: WO2018/035197
PCT Pub. Date: Feb. 22, 2018

(65) Prior Publication Data
US 2019/0186519 A1 Jun. 20, 2019

Related U.S. Application Data

(60) Provisional application No. 62/376,134, filed on Aug. 17, 2016, provisional application No. 62/489,724, filed on Apr. 25, 2017.

(51) Int. Cl.
*F16B 7/10* (2006.01)
*A63C 11/22* (2006.01)
(Continued)

(52) U.S. Cl.
CPC ............ *F16B 7/105* (2013.01); *A63C 11/221* (2013.01); *A63C 11/227* (2013.01); *A45B 2009/007* (2013.01); *F16B 21/02* (2013.01)

(58) Field of Classification Search
CPC . A63C 11/22; A63C 11/221; A45B 2009/007; Y10T 403/32467;
(Continued)

(56) References Cited

U.S. PATENT DOCUMENTS

| 1,827,129 A | 10/1931 | Williams |
| 2,184,358 A | 12/1939 | Moore |

(Continued)

FOREIGN PATENT DOCUMENTS

| CN | 2291693 U | 9/1998 |
| CN | 2734123 U | 10/2005 |

(Continued)

OTHER PUBLICATIONS

International Search and Written Report from the International Searching Authority for PCT Application No. PCT/US2017/047091, dated Nov. 8, 2017 (13 pages).

*Primary Examiner* — Daniel J Wiley
(74) *Attorney, Agent, or Firm* — Cook Alex Ltd.

(57) ABSTRACT

A collapsible telescoping pole assembly provided comprising at least first, second and third elongated tubular members, the second and third tubular members being slidably received within the first and second tubular member, respectively, between retracted and extended positions. A first locking mechanism is associated with the distal end of the first tubular member for releasably securing the second tubular member within the first tubular member in its extended position. The first locking member is biased to a locked position and movable to an unlocked position by rotating the first locking mechanism relative to the first tubular member, causing the first locking mechanism to move axially in a distal direction to permit the second tubular member to slide freely within the first in tubular member. A second locking mechanism is associated with the distal end of the second tubular member for releasably (Continued)

securing the third tubular member within the second tubular member in its extended position. The second locking mechanism is biased to a locked position and movable to an unlocked position by axially moving the second locking mechanism relative to the second tubular member in a distal direction to permit the third tubular member to slide freely within the second tubular member.

15 Claims, 13 Drawing Sheets

(51) Int. Cl.
*F16B 21/02* (2006.01)
*A45B 9/00* (2006.01)

(58) Field of Classification Search
CPC .... Y10T 403/32475; F16B 7/10; F16B 7/105; F16B 7/14; F16B 7/1409; F16B 7/1427; F16B 7/1436
See application file for complete search history.

(56) References Cited

U.S. PATENT DOCUMENTS

| | | | |
|---|---|---|---|
| 2,226,827 A | 12/1940 | Moore | |
| 2,430,649 A | 11/1947 | Schulz | |
| 2,455,525 A | 12/1948 | Schulz | |
| 2,526,415 A | 10/1950 | Refsdal | |
| 2,802,681 A | 8/1957 | Knights | |
| 2,884,270 A | 4/1959 | Carlberg | |
| 3,351,363 A * | 11/1967 | Downey | A47L 9/244 |
| | | | 285/303 |
| 3,697,103 A | 10/1972 | Mostyn | |
| 3,722,903 A | 3/1973 | Jones | |
| 4,616,952 A | 10/1986 | Schott | |
| 4,860,987 A | 8/1989 | Werner | |
| 5,367,743 A * | 11/1994 | Chang | B62B 1/125 |
| | | | 16/113.1 |
| 5,492,430 A | 2/1996 | Jones | |
| 5,584,645 A | 12/1996 | Kaspar | |
| 5,593,239 A * | 1/1997 | Sallee | E04H 12/182 |
| | | | 135/114 |
| 5,632,395 A | 5/1997 | Zimmermann | |
| 5,779,385 A | 7/1998 | Fechter | |
| 5,924,658 A * | 7/1999 | Shiery | F16B 7/1409 |
| | | | 248/125.8 |
| 6,354,629 B1 * | 3/2002 | McNeal | A63C 11/221 |
| | | | 135/75 |
| 6,796,529 B1 * | 9/2004 | Duran | B64C 1/36 |
| | | | 244/129.5 |
| 7,302,745 B2 | 12/2007 | Stahle | |
| 7,377,551 B2 | 5/2008 | Silverman et al. | |
| 7,441,479 B2 | 10/2008 | Ichikawa | |
| 7,621,200 B2 | 11/2009 | Ichikawa | |
| 8,007,196 B2 | 8/2011 | Whitling et al. | |
| 8,162,270 B2 | 4/2012 | Lee | |
| 8,197,348 B2 | 6/2012 | Eriksson et al. | |
| 8,500,357 B2 | 8/2013 | Stahle | |
| 9,328,862 B2 | 5/2016 | Hu | |
| 9,638,228 B2 | 5/2017 | Montalto et al. | |
| 10,030,681 B2 * | 7/2018 | Lai | F16B 7/105 |
| 2002/0141812 A1 | 10/2002 | Edelen et al. | |
| 2008/0315058 A1 * | 12/2008 | Zarpellon | F16M 11/28 |
| | | | 248/410 |
| 2010/0310306 A1 | 12/2010 | Wright | |
| 2013/0045041 A1 | 2/2013 | Sohn | |

FOREIGN PATENT DOCUMENTS

| | | |
|---|---|---|
| CN | 203098500 U | 7/2013 |
| CN | 203572315 U | 4/2014 |
| CN | 204692274 U | 10/2015 |
| DE | 2101208 A1 | 5/1972 |
| DE | 20121384 U1 | 10/2002 |
| DE | 202004017598 U1 | 3/2006 |
| DE | 102012002122 A1 | 8/2013 |
| EP | 293518 B1 | 2/1992 |
| GB | 527225 | 10/1940 |
| GB | 568582 | 4/1945 |
| GB | 729857 | 5/1955 |
| GB | 793447 | 4/1958 |
| GB | 999946 | 7/1965 |
| WO | WO9935409 A1 | 7/1999 |
| WO | WO200106137 A1 | 1/2001 |

* cited by examiner

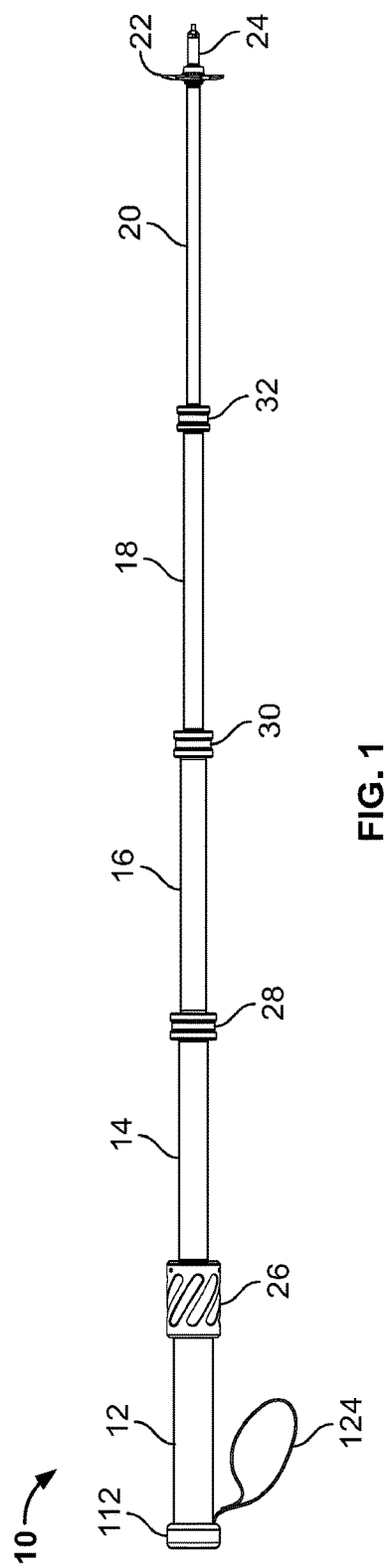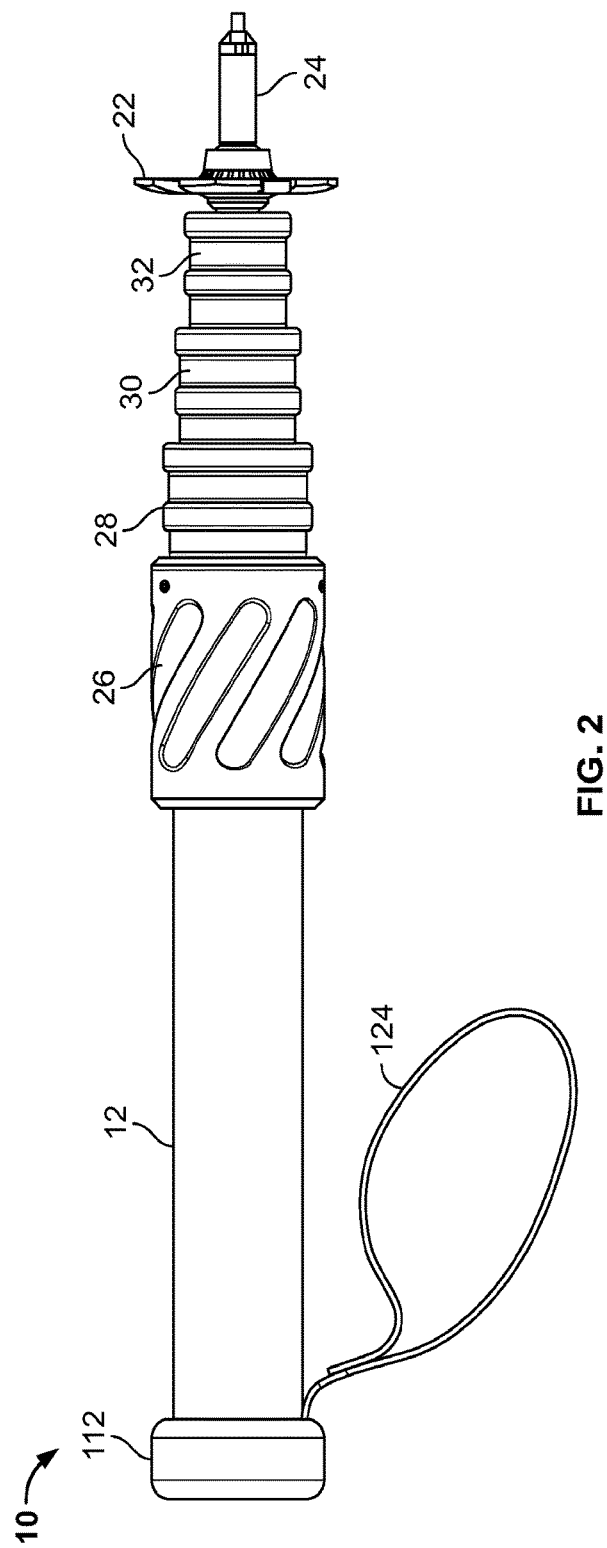

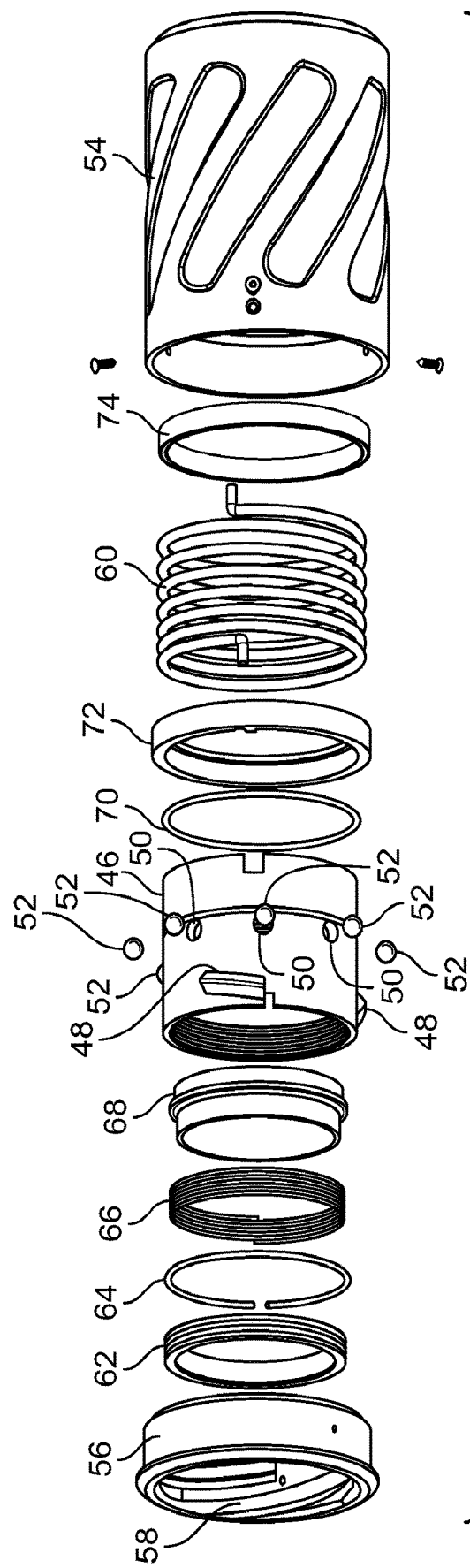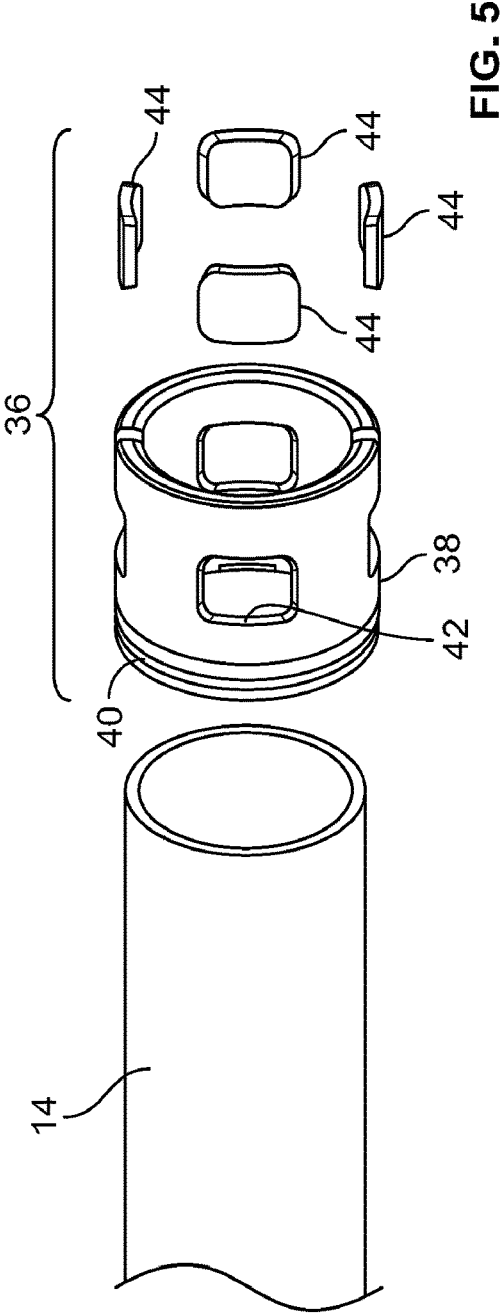

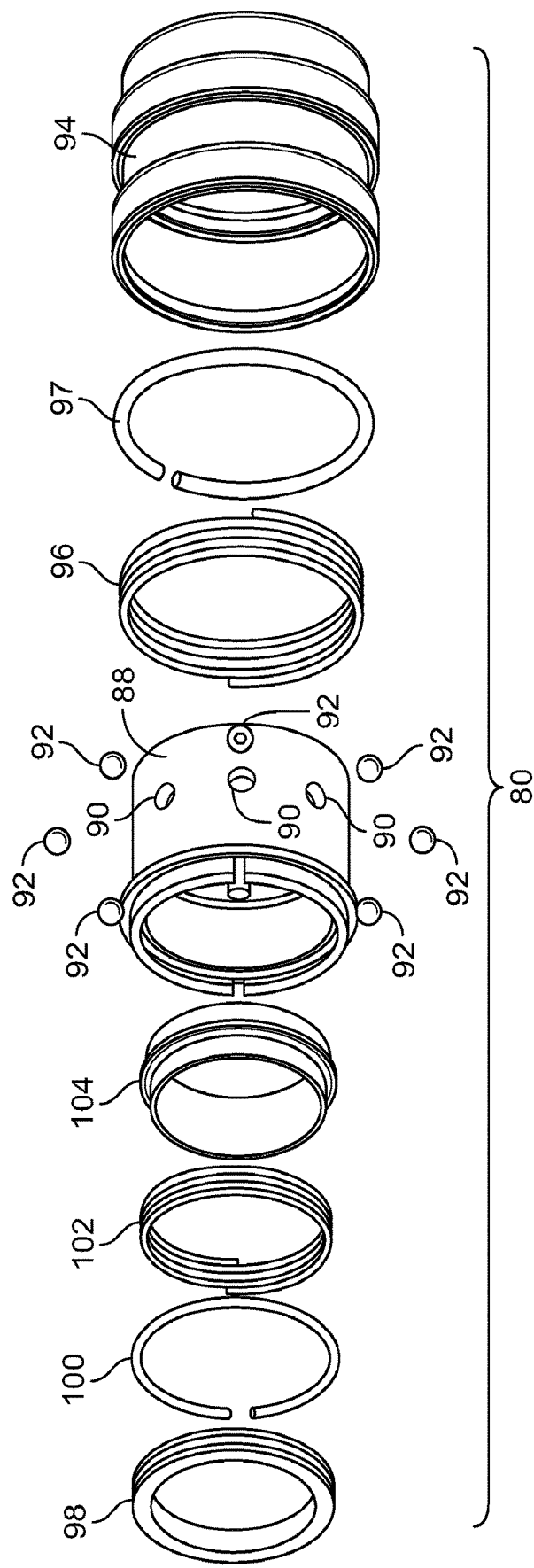
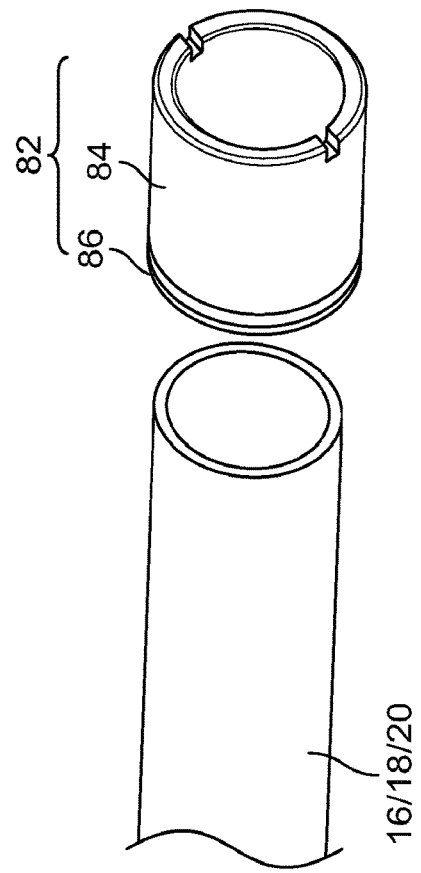
FIG. 8
FIG. 9

COLLAPSIBLE TELESCOPING POLE

CROSS-REFERENCE TO RELATED APPLICATIONS

The present application is a U.S. national phase application of International Patent Application No. PCT/US2017/047091, filed Aug. 16, 2017, which claims the benefit of and priority to U.S. Provisional Application No. 62/489,724, filed Apr. 25, 2017 and U.S. Provisional Application No. 62/376,134, filed Aug. 17, 2016 all of which are incorporated by reference herein in their entireties.

BACKGROUND

Field of Disclosure

The present application relates to a collapsible telescoping member and, more particularly, to a collapsible, telescoping pole for individuals desiring a handheld support providing balance and/or propulsion in snow based and other sporting and/or recreational activities.

Individuals engaged in snow based or other sporting and/or recreational activities, such as for example, snowboarding, skiing or hiking, will use a pole as a means of providing balance and/or propulsion. Snowboarders, for example, will use such a device in variety of situations, including when on flat, or generally flat terrain, rather than releasing a foot from the snowboard (typically the back foot) to push against the snow. As this hopefully occurs only occasionally while snowboarding, collapsible poles have been developed specifically for use by snowboarders and others that are adapted to be secured either to the snowboard or to an appendage of the person engaged in the sporting or recreational activity so as to be readily accessible when needed. See, e.g., U.S. Pat. No. 7,377,551.

By way of the present application, an improved collapsible, telescoping pole particularly suited for use by snowboarders and others engaged in snow based or other sporting and/or recreational activities is disclosed.

SUMMARY OF THE INVENTION

In a first aspect of the application, a collapsible telescoping pole assembly comprising at least first, second and third elongated tubular members, each having a proximal and distal end. The second tubular member is slidably received within the first tubular member so as to be movable between retracted and extended positions. Similarly, the third tubular member is slidably received within the second tubular member between retracted and extended positions so as to also be movable between retracted and extended positions.

A first locking mechanism is associated with the distal end of the first tubular member for releasably securing the second tubular member within the first tubular member in its extended position. The first locking member is biased to a locked position and is movable to an unlocked position by rotating the first locking mechanism relative to the first tubular member and causing the locking mechanism to move axially in a distal direction, to thus permit the second tubular member to slide freely within the first tubular member.

A second locking mechanism is associated with the distal end of the second tubular member for releasably securing the third tubular member within the second tubular member in its extended position. The second locking mechanism is biased to a locked position and movable to an unlocked position by axially moving the second locking mechanism relative to the second tubular member in a distal direction, to thus permit the third tubular member to slide freely within the second tubular member.

In a second aspect, the first locking mechanism is configured to engage the second locking mechanism upon the second tubular member being moved from its extended position to its retracted position, so as to axially move the second locking mechanism relative to the second tubular member in a distal direction to permit the third tubular member to slide freely within the second tubular member from its extended position to its retracted position.

In a third aspect, the collapsible telescoping pole assembly further comprises a release button associated with the proximal end of the first tubular member and a catch associated with the proximal end of the distal-most tubular member for releasably securing the second and third tubular members in their retracted positions.

These aspects, as well as others, will become apparent upon reference to the following detailed description and accompanying drawings.

BRIEF DESCRIPTION OF THE DRAWINGS

FIG. 1 is an elevational view of a collapsible telescoping snowboard pole according to the present application, with the pole in its extended position.

FIG. 2 is an elevational view of the collapsible telescoping snowboard pole of FIG. 1, with the pole in its retracted position.

FIG. 4 is an exploded perspective view of the portion of the twist locking member associated with the distal end of the tubular member comprising the handle portion of the collapsible pole.

FIG. 5 is an exploded perspective view of the proximal end of the first telescoping member and of the portion of the twist locking member associated with the proximal end of the first telescoping member of the collapsible pole.

FIG. 8 is an exploded perspective view of the portion of the locking member of FIG. 7 associated with the distal end of the tubular member comprising first telescoping member of the collapsible pole.

FIG. 9 is an exploded perspective view of the proximal end of the second telescoping member and of the portion of the locking member of FIG. 7 associated with the proximal end of the second telescoping member of the collapsible pole.

DETAILED DESCRIPTION

Figure 3:
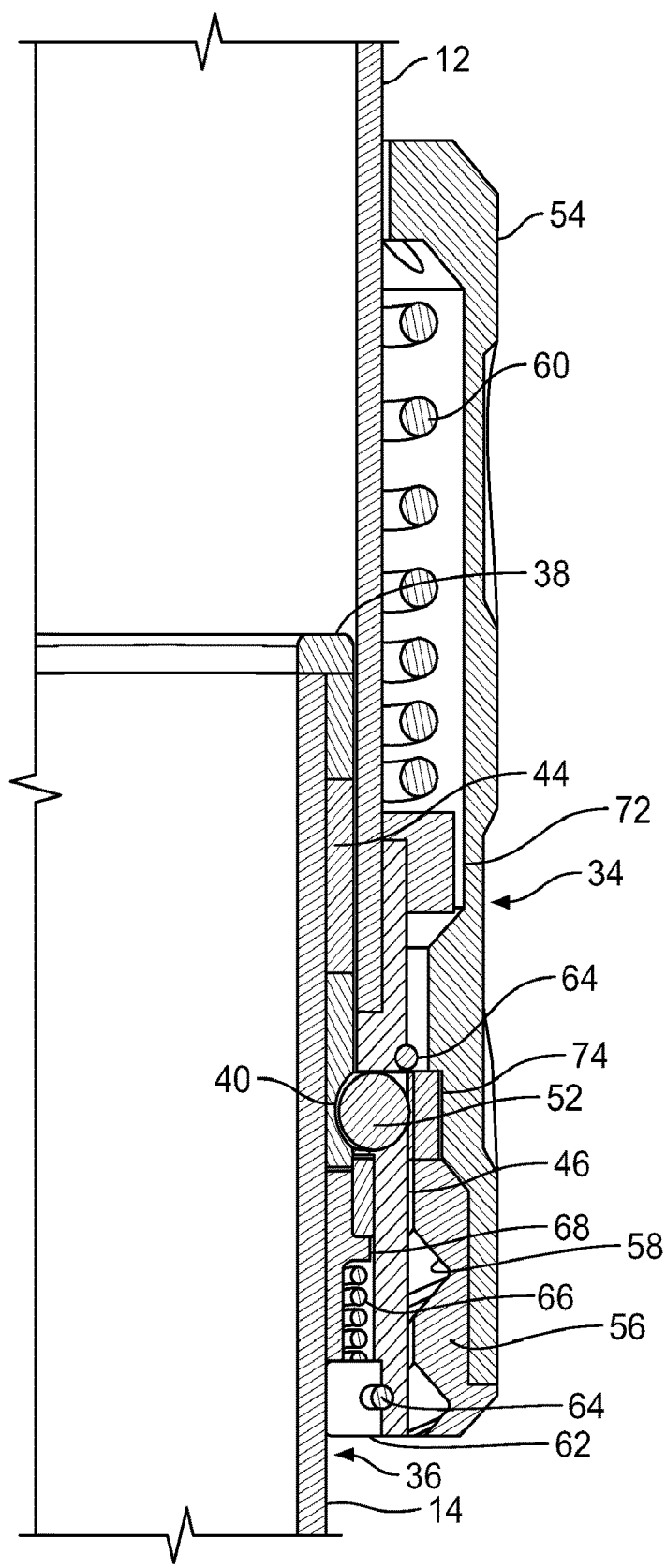
FIG. 3 is an enlarged cross-sectional view of a twist locking member associated with the distal end of the tubular member comprising the handle portion and the proximal end of the tubular member comprising the first telescoping member of the collapsible pole.

A more detailed description of a collapsible telescoping snowboard pole in accordance with the present application is set forth below. It should be understood that the description below of a specific device is meant to be exemplary, and not exhaustive of all possible variations or applications. Thus the scope of the disclosure is not intended to be limiting, and should be understood to encompass variations or embodiments that would occur to persons of ordinary skill.

Turning to FIGS. 1 and 2, a collapsible telescoping snowboard pole for providing, among other things, balance and/or propulsion, generally designated 10, is seen in its extended (FIG. 1) and retracted (FIG. 2) positions. As best seen in FIG. 1, the pole 10 comprises a series of stages or tubular members 12, 14, 16, 18 and 20, of decreasing diameters so that the second stage tubular member 14 may be slidably received within the first stage tubular member 12, the third stage tubular member 16 slidably received within the second stage tubular member 14, the fourth stage tubular member 18 slidably received within the third stage tubular member 16, and the fifth stage tubular member 20 slidably received within the fourth stage tubular member 18. By way of example, the diameter of the tubular member 12 may be 1.5 in., with the diameters of the successive tubular members 14-20 decreasing by 0.25 in., so that the fifth stage tubular member 20 has a diameter of 0.5 in. A basket 22 is mounted on a ferrule 24 that is secured in the distal end of the distal-most tubular member, which in the illustrated embodiment is the fifth stage tubular member 20, in a manner as is well-known in the art. While the illustrated pole has five tubular or stage members, it may have any number of three or more.

Locking mechanisms 26, 28, 30 and 32, described in greater detail below, releasably secure the tubular members 14, 16, 18 and 20 in their extended positions. Locking mechanism 26 is released by application of a twisting or rotational force that also moves the locking mechanism axially in a distal direction. Each of locking mechanisms 28, 30 and 32 is substantially identical, and is released by the application of an axial force in a distal direction. The axial force may be applied by engagement with the locking mechanism associated with the proximally adjacent tubular member, such that the tubular members may be sequentially retracted, starting with the retraction of the second tubular member 14 within the first tubular member 12.

Figure 14:
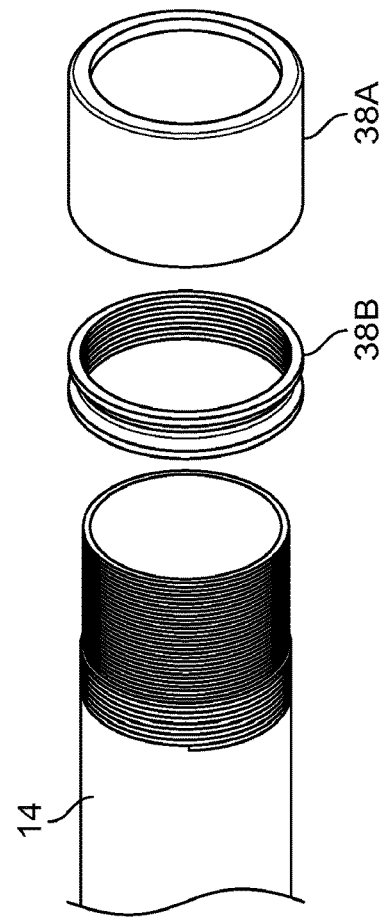
FIG. 14 is an exploded perspective view of an alternate embodiment to that shown in FIG. 5 of the proximal end of the first telescoping member and of the portion of the twist locking member associated with the proximal end of the first telescoping member of the collapsible pole.

With reference to FIGS. 3-5, the first locking mechanism 26 comprises a first portion, generally designated 34, that is associated with the distal end of the first stage tubular member 12, and a second portion, generally designated 36, associated with the proximal end of the second stage tubular member 14. The second portion 36 comprises an external sleeve or plunger 38, fastened to the second stage tubular member by, e.g., screw threads (not shown), that travels inside of the first stage tubular member 12, the plunger 38 includes a circumferential groove 40 for receiving detent members (locking balls, described below) associated with the first portion 34. As illustrated, the plunger 38 include a plurality (four shown) of cut-outs or windows 42 for receiving friction pads 44 that maintain the first portion in the unlocked position so that the pole can be lifted to collapse the entire pole. Alternatively, as shown in FIG. 14, the plunger may be made of two parts, 38A and 38B, with part 38B including a groove around its base for receiving the locking balls (described below). The windows 42 and friction pads 48 may be eliminated.

The first portion 34 of the first locking mechanism comprises a plurality of parts to accomplish the locking and release functions with respect to the first tubular member or handle 12, and the second tubular member 14. Turning again to FIGS. 3-5, the first portion 34 comprises a main body 46 that is secured to the distal end of the first stage tubular member 12 by, e.g., screw threads, adhesive, welding, etc. The main body 46 includes a discontinuous external helical thread 48, and a series of circumferentially-spaced apertures 50 that locate locking balls 52. When the locking mechanism 26 is in the locked position, the circumferential apertures 50 are aligned with the circumferential groove 40 of the plunger 38 so that the locking balls 52 are seated in the groove 40.

The first portion 34 also includes a twist grip body 54 that encloses the main body 46/locking balls 52. The twist grip body 54 has a threaded locking body 56 secured to its distal end, the locking body 56 having an internal thread 58 that mates with the external thread 48 of the main body 46, so that when the twist grip body 54 is rotated relative to the first stage tubular member 12, the twist grip body 54 simultaneously moves axially in a distal direction relative to the first stage tubular member 12 to allow the locking balls 52 to move out of the circumferential groove 40 in the plunger 38, thus unlocking the second stage tubular member 14 from the first stage tubular member 12 and permitting the second stage tubular member 14 to move from its extended position (FIG. 1) to its retracted position (FIG. 2). A torsion spring 60 is provided that biases the twist grip body 54 to the locked position, the spring ends being received in pockets in the twist grip body 54, on one end, and in the interior of the main body 46, on the other end.

Other components of the illustrated first locking mechanism 26 include a main body ring 62, a main body ring spring retainer ring 64, a locking ball retaining ring spring 66, a locking ball retaining ring 68, a main body retainer ring 70, a torsion spring retainer 72, and an imbedded retainer ring 74.

Figure 12:
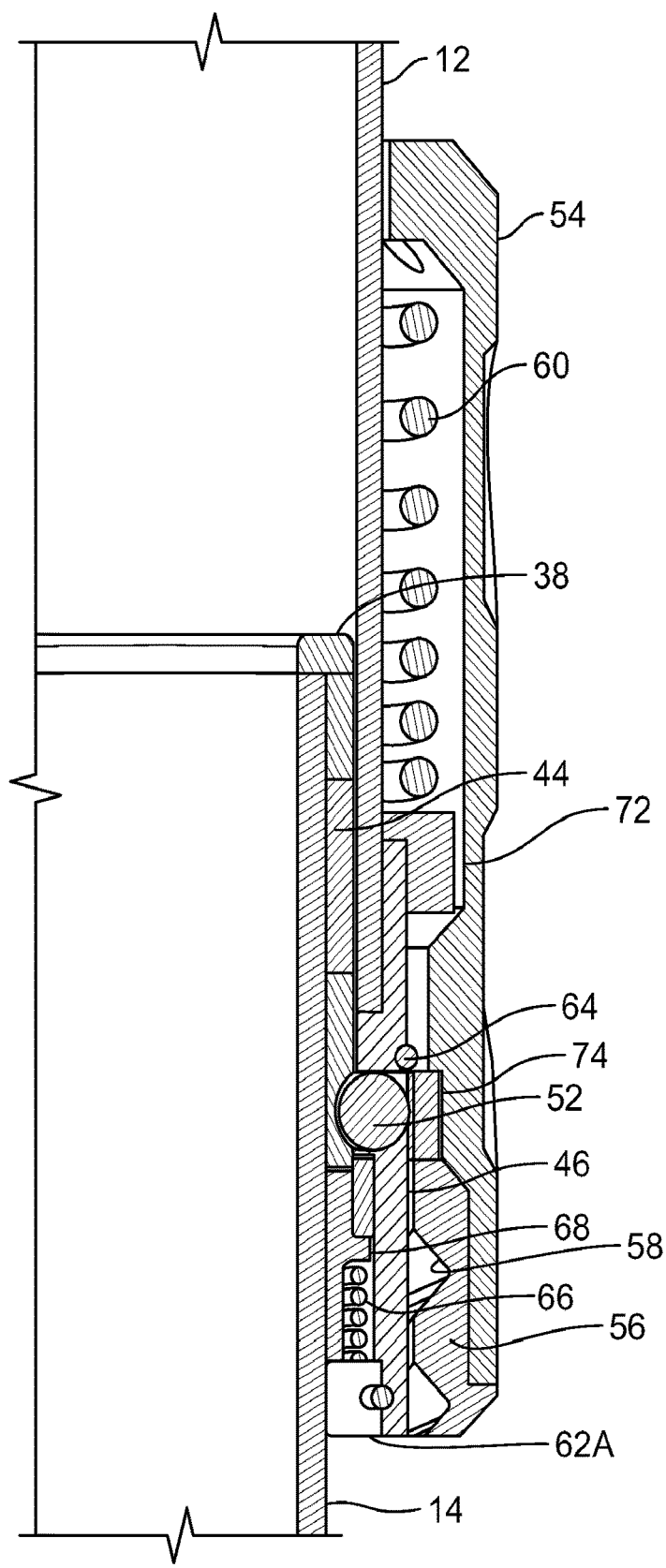
FIG. 12 is an enlarged cross-sectional view of an alternate embodiment of the twist locking member of FIG. 3 associated with the distal end of the tubular member comprising the handle portion and the proximal end of the tubular member comprising the first telescoping member of the collapsible pole.
Figure 13:
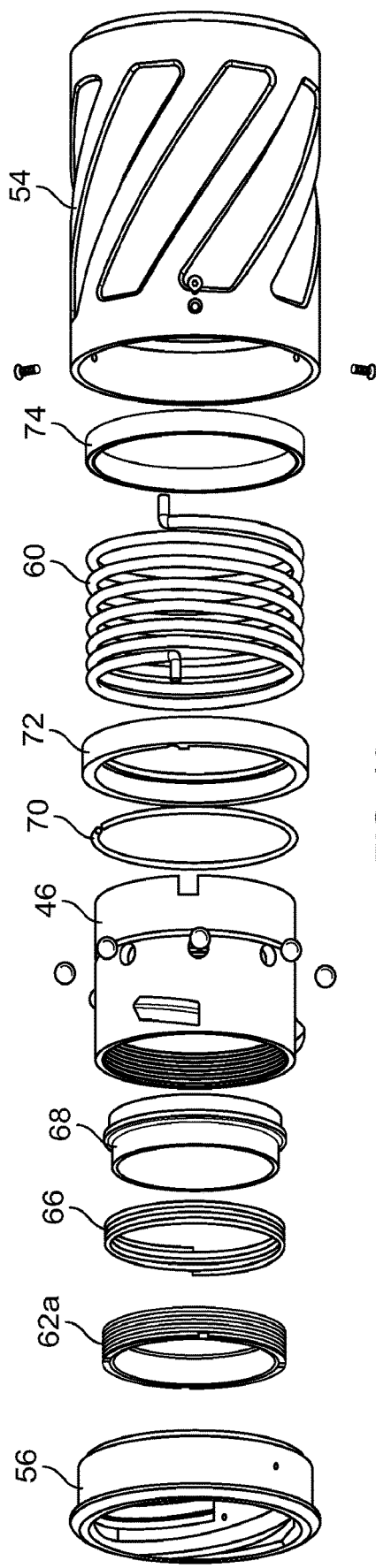
FIG. 13 is an exploded perspective view of the portion of the twist locking member associated with the distal end of the tubular member comprising the handle portion of the collapsible pole shown in FIG. 12.

The main body ring 62 is secured within the main body 46 and includes an external groove for receiving the main body spring retainer ring 64. It serves to hold the locking ball retaining ring 66 and the ball retaining ring spring 66 in the main body 46. Alternatively, as shown in FIGS. 12 and 13, the main body spring retainer ring 64 may be eliminated, and the main body ring 62 replaced with main body ring 62A that threads into place and is preferably secured in place with a thread locking adhesive. The main body ring 62A may be coated with Teflon®, or an equivalent plastic, and a spanner wrench may be used to tighten and loosen the part.

The locking ball retaining ring spring 66 is a compression spring that provides a force against the main body ring 62 and the locking ball retaining ring 66.

The locking ball retaining ring 68 is pushed upwardly by the locking ball retaining ring spring to allow the first locking mechanism 26 to remain unlocked when the pole is in the collapsed configuration by preventing the locking balls 52 from moving out of the circumferential groove 40 in the plunger 38 and into a relieved portion of the twist grip body 54. When the locking mechanism is locked, with the tubular members in the extended position, the plunger 38 pushes downwardly on the locking ball retaining ring 68 to compress the locking ball retaining ring spring 66.

The main body retainer ring 70 fits into a groove in the interior surface of the main body 46 and provides a travel stop for the imbedded retainer ring 74.

The torsion spring retainer 72 holds the end of the torsion spring 60 in the pocket provided in the main body 46.

The imbedded retainer ring 74 is located concentric to the twist grip body 54, resting against an interior shoulder. When the pole is locked in the extended position, the imbedded retainer ring 74 holds the locking balls 52 inwardly, so as to be seated in the groove 40 in the plunger 38. When the pole is collapsed, the imbedded retainer ring 74 is held in the down position by the locking balls 52.

Figure 6C:
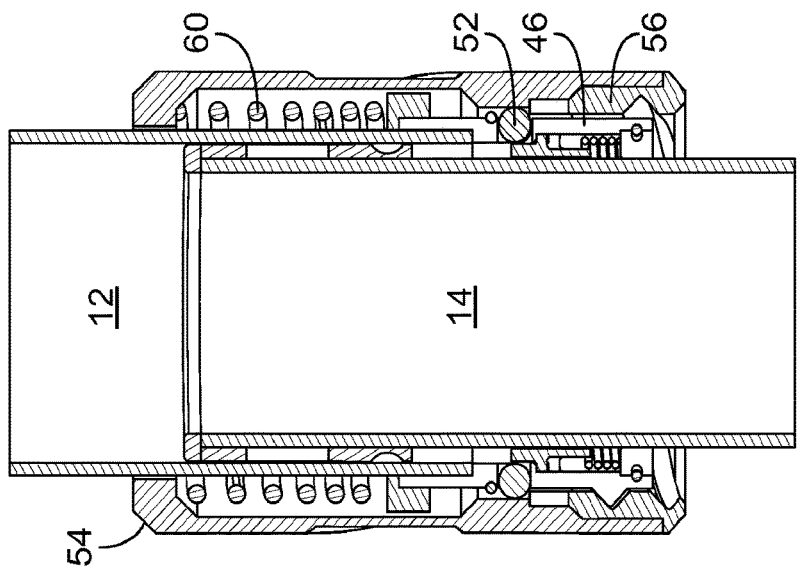
FIGS. 6A, 6B and 6C are cross sectional views of the first locking member in the locked, unlocking and unlocked positions, respectively.
Figure 6B:
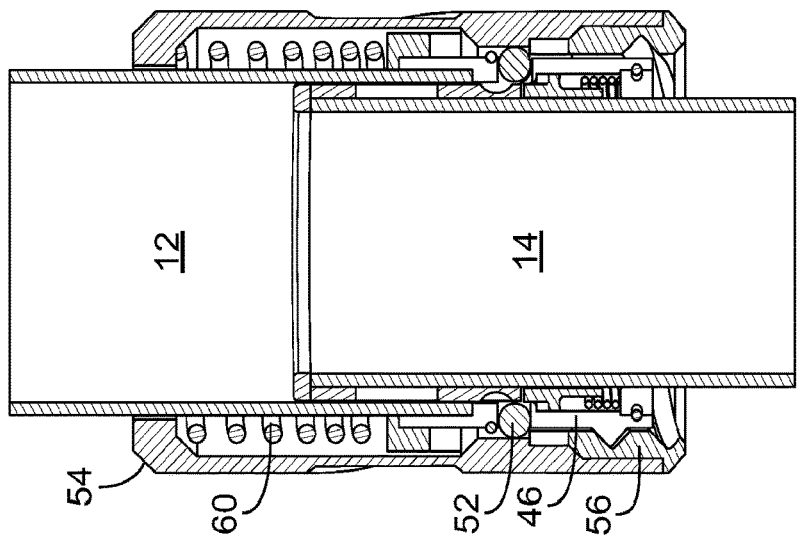
Figure 6A:
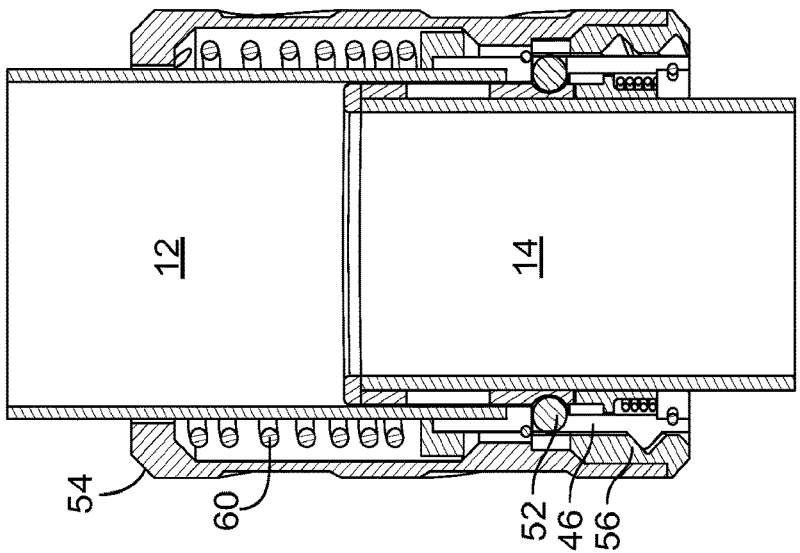

The operation of the first locking mechanism is illustrated in FIGS. 6A-6C. With reference to FIG. 6A, to unlock the locking mechanism, the user grasps the twist lock grip body 54 and rotates the body counterclockwise (when viewed from the top). This twist motions produces a downward linear motion of the body 54 and associated parts by means of the threaded interface between the main body 46 and the internal threaded locking body 56. The ball retaining ring 68 moves downwardly and the locking balls 52 are free to move outward, releasing the plunger (FIG. 6B). The locking balls 52 are forced outward from the groove 40 by an upward camming force from the plunger 38. The ball retaining ring spring 66 (combined with the user pushing down on the pole) push the plunger 38 upward, clearing space for the ball retaining ring 68 to move upward, thus preventing the locking balls 52 from returning to their previous position in the groove 40. With the ball retaining ring 68 holding the locking balls 52 outward, the imbedded retainer ring 74 is prevented from returning to original position, shown in FIG. 6A. The torsion spring 60 is loaded (the user having twisted it) to generate the force necessary to keep the imbedded retainer ring 74 pressed against the locking balls 52.

When the user chooses to extend the pole, an extension release button located on the proximal end of the first stage tubular/handle member 12 (described in greater detail below) is depressed. The stages 14, 16, 18 and 20 of the pole drop due to the force of gravity, and each locking assembly 26, 28, 30 and 32 locks. Locking the twist lock assembly 34, requires a light downward tug on any of the lower stages 14, 16, 18 and 20 to overcome the resistance from the friction pads 44 and the locking ball retaining ring spring 66. When the downward tug is applied, the plunger 38 makes contact with the locking ball retaining ring 68 to compress the locking ball retaining ring spring 66. The locking balls 52 are then forced into the plunger groove 40 by the force from the torsion spring 60. The joint is now locked.

Figure 7:
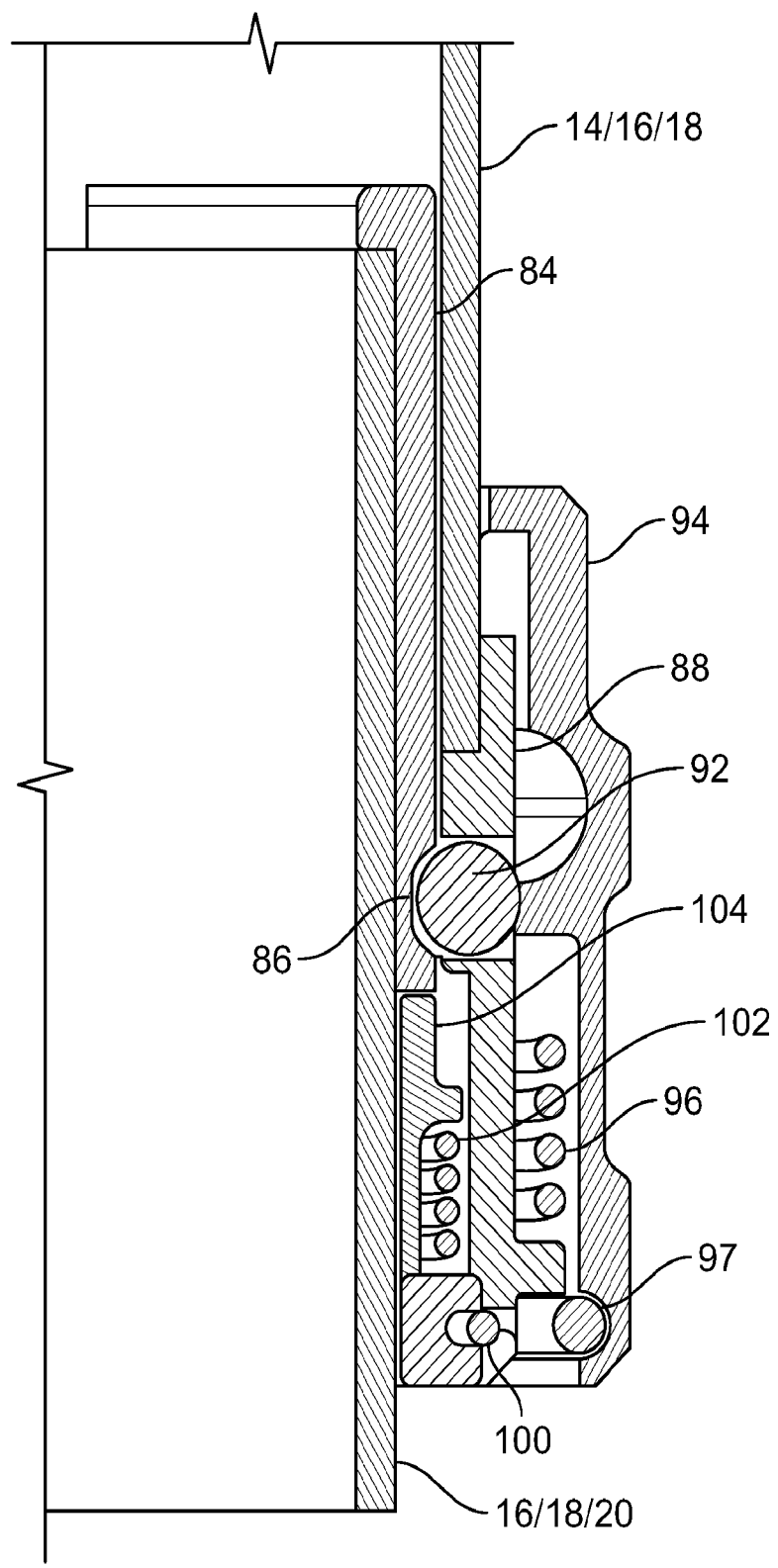
FIG. 7 is an enlarged cross-sectional view of a locking member associated with the distal end of the tubular member comprising the first telescoping member and the proximal end of the tubular member comprising the second telescoping member of the collapsible pole.

Turning to FIGS. 7-9, locking mechanisms 28, 30 and 32, associated with the stage two-stage five tubular members 14, 16, 18 and 20, are described. As noted above, each of these locking mechanisms is substantially identical, differing only in diameter of the parts and the number of locking balls, and each unlocks by the application of an axially downward force.

Each of the locking mechanism 28, 30 and 32 comprises a first portion, generally designated 80, that is associated with the distal end of each of the second, third and fourth stage tubular members 14, 16 and 18, and a second portion, generally designated 82, associated with the proximal end of the third, fourth and fifth stage tubular member 16, 18 and 20. The second portion 82 comprises an external sleeve or plunger 84, substantially similar to the plunger 38 described above. Like the plunger 38, the plunger 84 travels inside of the tubular member that is proximal thereto, and is fastened to its respective tubular member by, e.g., screw threads (not shown). The plunger 84 includes a circumferential groove 86 for receiving locking balls (described below) associated with the first portion 80. While not shown, the plunger 84 may optionally include a plurality of cut-outs or windows for receiving friction pads that maintain the first portion in the unlocked position so that the pole can be lifted to collapse the entire pole, as described above in connection with plunger 34.

The first portion 80 of each of the locking mechanisms 28, 30 and 32 comprises a plurality of parts to accomplish the locking and release functions. Turning again to FIGS. 7-9, the first portion 80 comprises a main body 88 that is secured to the distal end of second, third or fourth stage tubular member 14, 16, 18 by, e.g., screw threads, adhesive, welding, etc. The main body 88 includes a series of circumferentially-spaced apertures 90 that locate locking balls 92. When the locking mechanisms 28, 30 and 32 are in the locked position, the circumferential apertures 90 are aligned with the circumferential grooves 86 of the associated plungers 84 so that the locking balls 92 are seated in the grooves 86.

The first portion 80 also includes an outer locking body 94 that encloses the main body 88/locking balls 92. An outer locking body spring 96 is provided that biases the outer locking body 94 upwardly to the locked position. An outer locking body spring retainer ring 97 fits into an inner groove in the base of the outer locking body 94 to limit the travel of the outer locking body 94 by contacting an outer shoulder on the main body 88.

Figure 15:
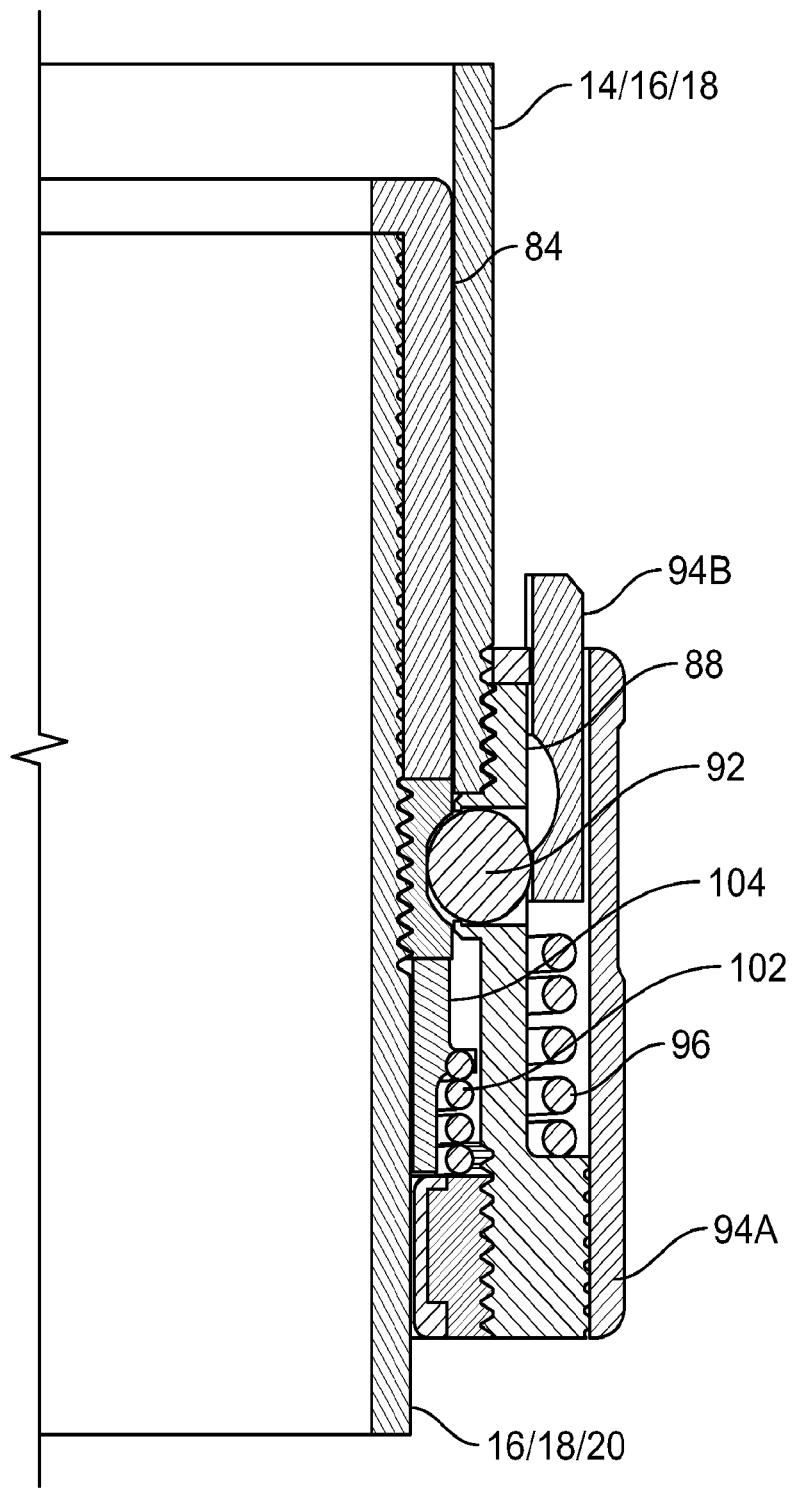
FIG. 15 is an enlarged cross-sectional view of an alternate embodiment of the locking member of FIG. 7 associated with the distal end of the tubular member comprising the first telescoping member and the proximal end of the tubular member comprising the second telescoping member of the collapsible pole.
Figure 16:
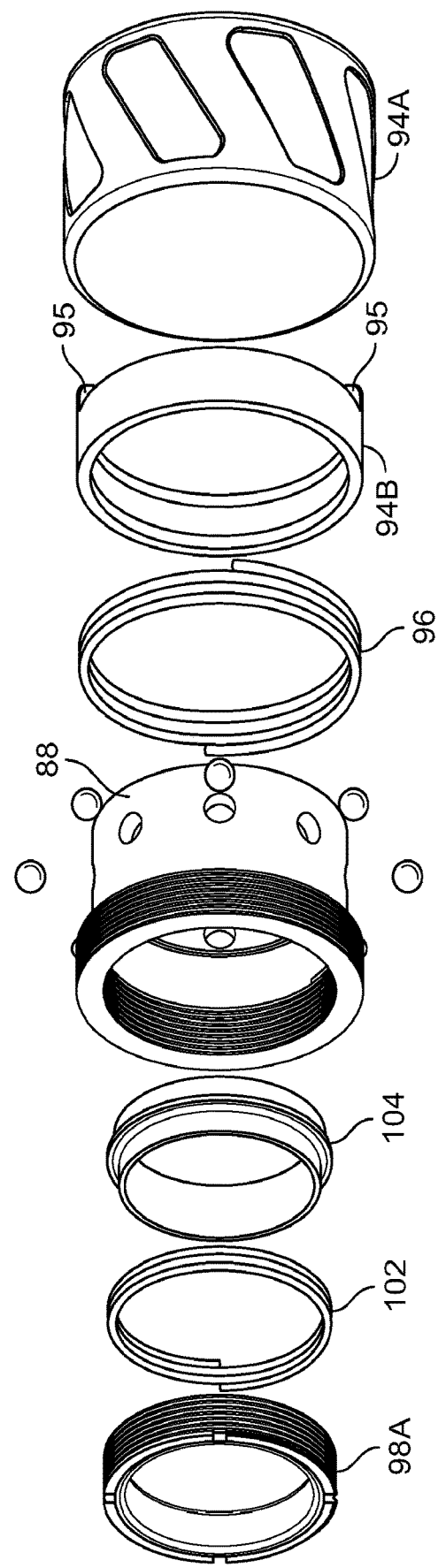
FIG. 16 is an exploded perspective view of the portion of the locking member of FIG. 15 associated with the distal end of the tubular member comprising first telescoping member of the collapsible pole.

Alternatively, as shown in FIGS. 15 and 16, the outer locking body may comprise two parts, an outer body 94A and an outer locking ring 94B, and the main body ring 98 and main body ring retainer 100, described below, may be eliminated. The outer body 94 all of the components of the lock assembly, while the outer locking ring 94B limits the travel of the outer body 94A. The outer locking ring 94B performs a similar function to the outer locking body spring retainer ring 97, and includes two tabs 95 that extend through ports in the outer body 94A that provide a means to unlock the joint.

Other components of the locking mechanisms 28, 30 and 32 include a main body ring 98, a main body ring spring retainer ring 100, a locking ball retaining ring spring 102, and a locking ball retaining ring 104. Each is substantially similar in structure and function to the main body ring 62, main body ring spring retainer ring 64, locking ball retaining ring spring 66, and locking ball retaining ring 68 described above, and thus will not be described in greater detail here.

Alternatively, and also as shown in FIGS. 15 and 16, the main body ring spring retainer ring 100 may be eliminated and main body ring 98 replaced with main body ring 98A, which is similar to the main body ring 62A described above in that it threads into place and is preferably secured in place with a thread locking adhesive. The main body ring 92A may be coated with Teflon®, or an equivalent plastic, and a spanner wrench may be used to tighten and loosen the part.

Figure 10A:
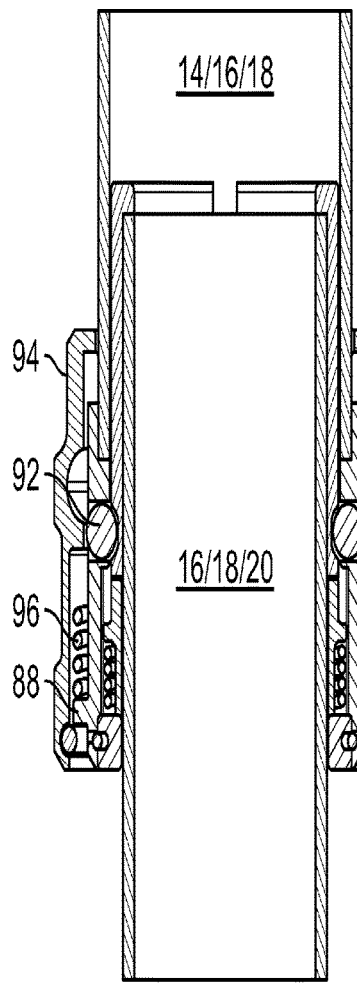
FIGS. 10A, 10B and 10C are cross sectional views of the locking member of FIG. 7 in the locked, unlocking and unlocked positions, respectively.
Figure 10B:
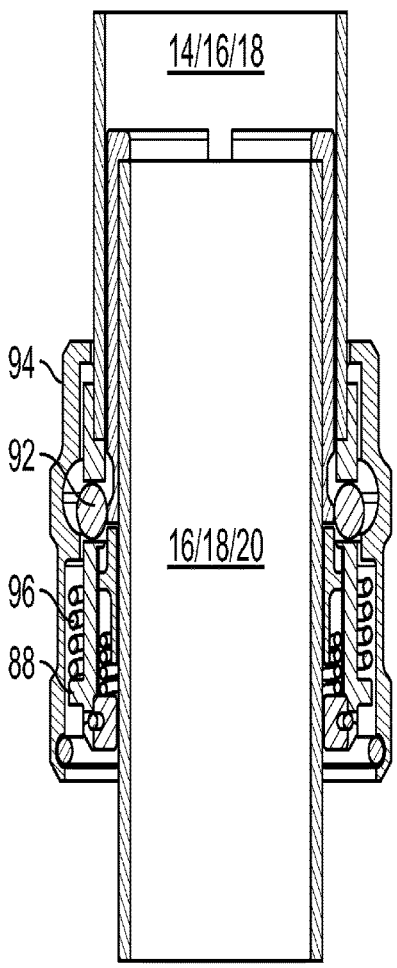
Figure 10C:
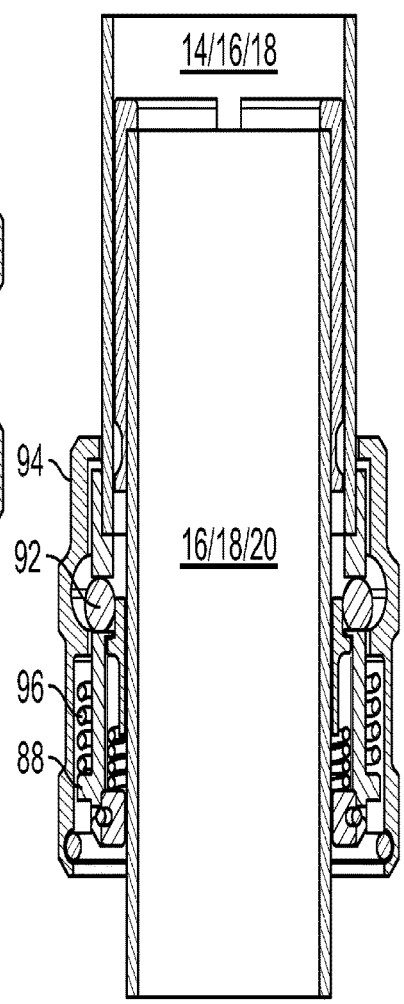

The operation of the locking mechanisms 28, 30 and 32 is illustrated in FIGS. 10A-10C. With reference to FIG. 10A, the joints of the pole 10 are intended to be unlocked sequentially from larger to smaller. The pole 10 is collapsed by starting with the twist grip locking assembly 26. As described previously, the user twists the twist grip body 54 to release the stage one lock, the locking ball retaining ring spring 66 forces the stage one plunger 30 to exit the stage one locking mechanism 34. The user, by pushing down on the pole 10 or grasping each end of the pole 10, slides the pole to collapse the unit. As the stage one tube 12 slides down over the stage two tube 14, the bottom of the stage one locking mechanism 34 and stage one main body ring 62 contact the top of the stage two outer locking body 80. This contact forces the stage two outer locking body 80 to move downwardly, allowing the stage two locking balls 92 to move outward into an inner groove pocket in the outer locking body 94. The locking balls 92 are forced outwardly by upward motion of the plunger 84. The locking ball retaining ring spring 102, combined with the user pushing down on the pole 10, moves the plunger 84 upwardly. This clears space for the locking ball retaining ring 104 to move upwardly, thus preventing the locking balls 92 from returning to their previous position in the groove 86 of the plunger 84. As the locking balls 92 move outwardly, the stage two plunger 84 is released, and the stage three tube 16 is collapsed inside of the stage two tube 14.

With the locking ball retaining ring 104 holding the locking balls 92 outward, the outer locking body 94 is prevented from returning to original position shown in FIG. 100 by means of an inner lip (similar to the imbedded retainer ring). The outer locking body spring 96 is compressed in this state, and generates the force to keep the inner lip of the outer locking against the locking balls 92.

The unlocking sequence is repeated for all subsequent stages.

Figure 17A:
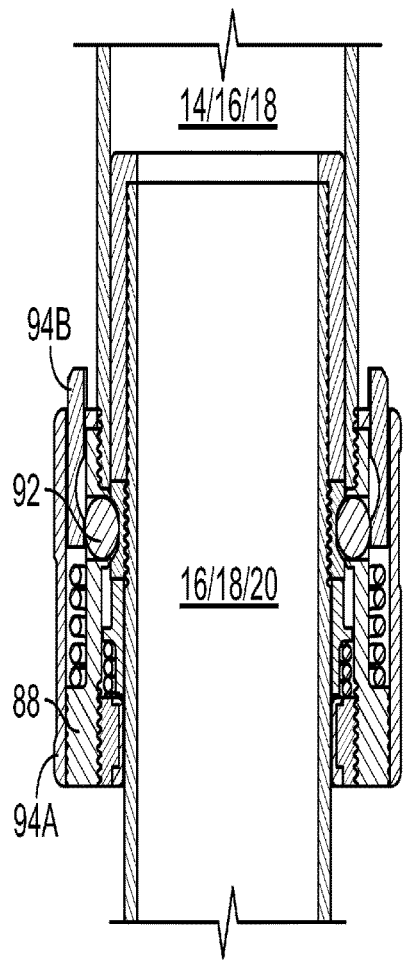
FIGS. 17A, 17B and 17C are cross sectional views of the locking member of FIG. 15 in the locked, unlocking and unlocked positions, respectively.
Figure 17B:
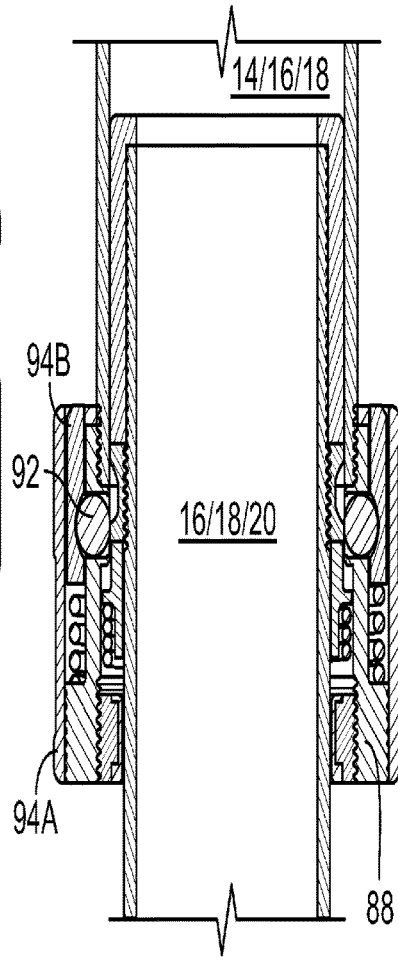
Figure 17C:
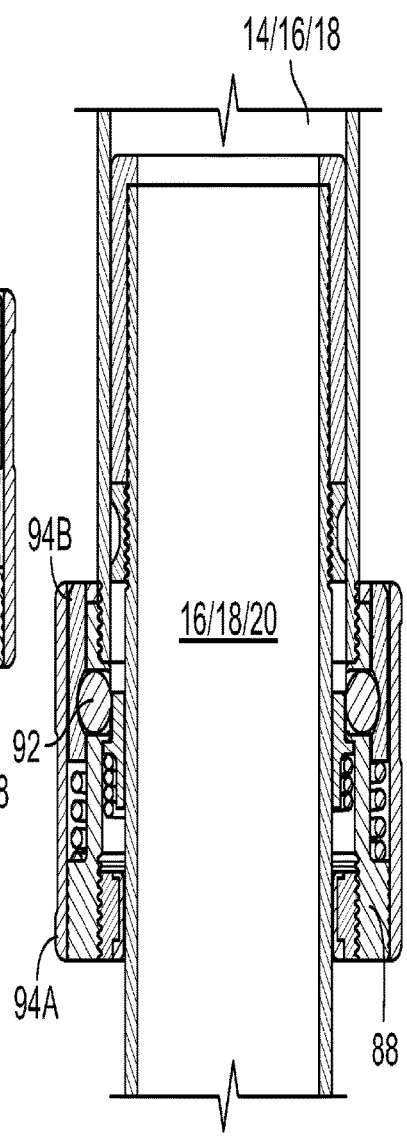

The operation of the locking mechanisms 28, 30 and 32, as modified in FIGS. 15 and 16, is illustrated in FIGS. 17A-17O. The action is similar to that described above with respect to FIGS. 10A-10C, with the following difference: it is the tabs 95 of the outer locking ring 94B that are contacted by the bottom of the main body 85 and main body ring 98A of the associated tubular member 14, 16 or 18 to force the outer locking ring 94B downward to allow the locking balls 92 to move outwardly into the grooved portion of the outer locking ring 94A.

To extend the pole 10, an extension release button located on the proximal end of the first stage tubular/handle member 12 (described in greater detail below) is depressed. The pole stages 14, 16, 18 and 20 drop by force of gravity, and each locking assembly 26, 28, 30 and 32 locks. Locking the twist lock assembly 26 is described above. A light downward tug on the stage five tube 20 ensures all joints are properly locked. When the downward tug is applied, the plungers 38, 84 make contact with the locking ball retaining ring 68, 104 and compress the locking ball retaining ring springs 66, 102 (for the joints that did not lock by gravity).

Figure 11:
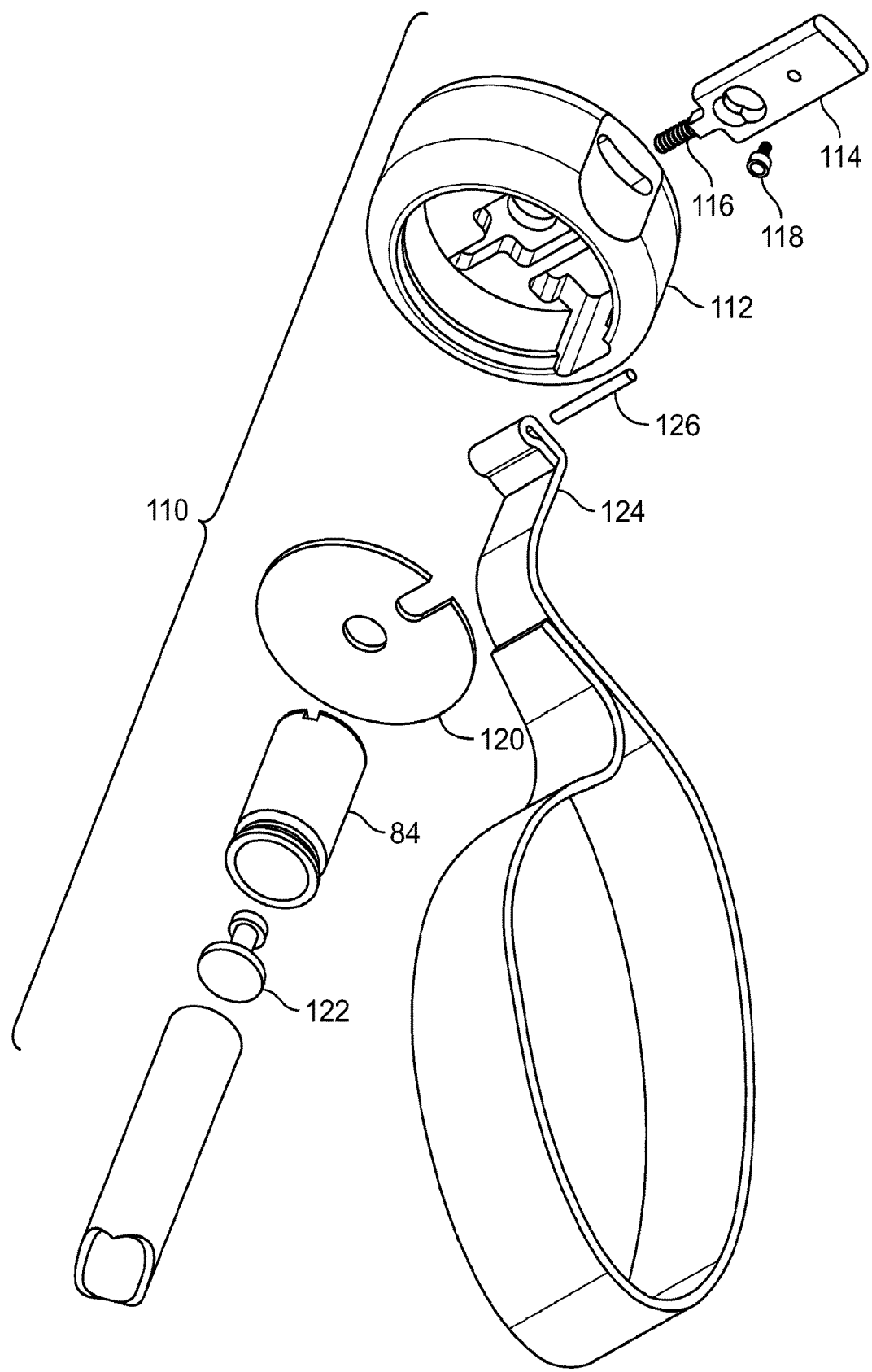
FIG. 11 is an exploded perspective view of a release button associated with the proximal end of the tubular member comprising the handle portion of the collapsible pole.

Turning to FIG. 11, there is seen a locking mechanism, generally designated 110, for releasably securing the tubular members of the pole 10 in the retracted position. The locking mechanism 110 comprises an end grip body 112 secured to the proximal end of the stage one tubular member/handle 12. The end grip body 112 may be secured to the tubular member 12 by screw threads (not shown). The end grip body 112 includes a slot or pocket that slidably receives an extension release button 114 and associated spring 116, the spring 116 biasing the release button 114 outwardly toward the locked position. The release button also receives a set screw 118 that acts as a stop to prevent the release button 114 from sliding out of the slot. A retainer plate 120 is received internally of the end grip body 112, so as to be sandwiched between the end grip body 112 and the proximal end of the stage one tubular member 12, to maintain the release button 114 in the slot of the end grip body 112.

The distal-most tubular member (the stage five tubular member 20 in the illustrated embodiment) has a catch pin 122 secured to its proximal end by means of the associated plunger 84, described above. The catch pin 122 includes an enlarged, coned tip that, when the tubular members are moved to the retracted position, passes through an aperture in the retainer plate 120 and engages the edge of an elongated aperture in the release button 114. This moves the release button inwardly against the force of the spring 116, thus permitting the tip to pass through the aperture. After the tip passes through the aperture, the release button is forced outwardly by the spring 116 so that a narrowed portion of the aperture engages the underside of the enlarged tip 122 to lock all the tubular members in the retracted position. Pushing the release button 114 inwardly aligns the aperture with the coned tip 122 to permit the tip 122 to pass back through the aperture, and consequently allowing the tubular members to move from the retracted position to the extended position.

The end grip body 112 may also serve to secure a wrist strap 124 to the handle member 12 of the pole by means of a pin 126 received internally of the end grip body 112. In the illustrated embodiment, the retainer plate 120 serves to hold the pin 126 in place once the end grip body 112 is secured to the handle member 12.

Thus, an improved collapsible telescoping pole for snow based and/or other sporting and recreational activities, such as for example snowboarding, skiing or hiking, has been disclosed. While the pole has been described in the context of a preferred embodiment, obvious variations would be apparent to those skilled in the art. For example, the collapsible pole has been described in the context of a pole having five stages. However, it is apparent that collapsible pole may fully utilize the features described above as long as it has at least three stages. Further, the two different locking mechanisms described above could be used independently with any two telescoping members, and not necessarily in combination.

The invention claimed is:

1. A collapsible telescoping pole assembly comprising:
   at least first, second and third elongated tubular members, each having a proximal and distal end, the second tubular member being slidably received within the first tubular member between retracted and extended positions, and the third tubular member being slidably received within the second tubular member between retracted and extended positions;

a first locking mechanism secured to the distal end of the first tubular member for releasably securing the second tubular member within the first tubular member in its extended position, the first locking mechanism being biased to a locked position and being movable to an unlocked position by rotating the first locking mechanism relative to the first tubular member, the rotating causing the first locking mechanism to move axially with respect to the first tubular member in a distal direction to permit the second tubular member to slide freely within the first tubular member; and a second locking mechanism secured to the distal end of the second tubular member for releasably securing the third tubular member within the second tubular member in its extended position, the second locking mechanism being biased to a locked position and being movable to an unlocked position by axially moving the second locking mechanism relative to the second tubular member in a distal direction to permit the third tubular member to slide freely within the second tubular member.

2. The collapsible telescoping pole assembly of claim 1 wherein the first locking mechanism is configured to engage the second locking mechanism upon the second tubular member being moved from its extended position to its retracted position so as to axially move the second locking mechanism relative to the second tubular member in a distal direction to permit the third tubular member to slide freely within the second tubular member from its extended position to its retracted position.

3. The collapsible telescoping pole assembly of claim 1 further comprising a release button associated with the proximal end of the first tubular member and a catch associated with the proximal end of the distal-most tubular member for releasably securing the second and third tubular members in their retracted positions.

4. The collapsible telescoping pole assembly of claim 1 wherein the first locking assembly comprises a first sleeve secured to the proximal end of the second tubular member, a first main body secured to the distal end of the first tubular member, a plurality of detents captured between the first sleeve and the first main body to prevent axial movement of the second tubular member relative to the first tubular member, and an outer grip body mounted to the distal end of the first tubular member so as to be movable both rotationally and axially relative to the first tubular member to disengage the detents to permit axial movement of the second tubular member relative to the first tubular member.

5. The collapsible telescoping pole assembly of claim 4 wherein the detents comprise ball members, the first sleeve includes a circumferential groove for seating the ball members when in the locked position, and the first main body includes a plurality of circumferentially-spaced apertures for receiving the ball members.

6. The collapsible telescoping pole assembly of claim 4 wherein the first main body is formed with external threads and the outer grip body is provided with complementary internal threads so that axial movement of the outer grip body relative to the first tubular member is imparted by rotational movement of the outer grip body relative to the first tubular member.

7. The collapsible telescoping pole assembly of claim 6 further comprising a first coil spring interposed between the first tubular member and the outer grip body for biasing the outer grip body to the locking position.

8. The collapsible telescoping pole assembly of claim 1 wherein the second locking assembly comprises a second sleeve secured to the proximal end of the third tubular member, a second main body secured to the distal end of the second tubular member, a plurality of detents captured between the second sleeve and the second main body to prevent axial movement of the third tubular member relative to the second tubular member, and an outer locking body mounted to the distal end of the second tubular member so as to be movable axially relative to the second tubular member to disengage the detents to permit axial movement of the third tubular member relative to the second tubular member.

9. The collapsible telescoping pole assembly of claim 8 wherein the detents comprise ball members, the second sleeve includes a circumferential groove for seating the ball members when in the locked position, and the second main body includes a plurality of circumferentially-spaced apertures for receiving the ball members.

10. The collapsible telescoping pole assembly of claim 8 further comprising a second coil spring interposed between the second main body and the outer locking body for biasing the outer locking body to the locking position.

11. A locking mechanism for selectively permitting or preventing relative axial movement between a first tubular member and a second tubular member slidably received within the first tubular member between extended and retracted positions, each of the tubular members having a proximal end and a distal end, the locking mechanism being secured to the distal end of the first tubular member for releasably securing the second tubular member within the first tubular member in the extended position, the locking mechanism being biased to a locked position and being movable to an unlocked position by rotating the locking mechanism relative to the first tubular member, the rotating causing the locking mechanism to move axially with respect to the first tubular member in a distal direction to permit the second tubular member to slide freely within the first tubular member.

12. The locking mechanism of claim 11 further comprising a sleeve secured to the proximal end of the second tubular member, a main body secured to the distal end of the first tubular member, a plurality of detents captured between the sleeve and the main body to prevent axial movement of the second tubular member relative to the first tubular member, and an outer grip body mounted to the distal end of the first tubular member so as to be movable both rotationally and axially relative to the first tubular member to disengage the detents to permit axial movement of the second tubular member relative to the first tubular member.

13. The locking mechanism of claim 12 wherein the detents comprise ball members, the sleeve includes a circumferential groove for seating the ball members when in the locked position, and the main body includes a plurality of circumferentially-spaced apertures for receiving the ball members.

14. The locking mechanism of claim 12 wherein the main body is formed with external threads and the outer grip body is provided with complementary internal threads so that axial movement of the outer grip body relative to the first tubular member is imparted by rotational movement of the outer grip body relative to the first tubular member.

15. The locking mechanism of claim 11 further comprising a coil spring interposed between the first tubular member and the outer grip body for biasing the outer grip body to the locking position.

* * * * *